United States Patent
Funk et al.

(10) Patent No.: US 8,757,717 B2
(45) Date of Patent: Jun. 24, 2014

(54) VEHICLE SEAT COMPRISING A PARTITIONED BACK REST

(75) Inventors: Stefan Funk, Leichlingen (DE); Franz Albers, Cologne (DE); James Abraham, Cologne (DE); Bernd Engels, Remscheid (DE)

(73) Assignee: Johnson Controls Technology Company, Holland, MI (US)

( * ) Notice: Subject to any disclaimer, the term of this patent is extended or adjusted under 35 U.S.C. 154(b) by 744 days.

(21) Appl. No.: 12/594,327

(22) PCT Filed: Mar. 31, 2008

(86) PCT No.: PCT/EP2008/002548
§ 371 (c)(1),
(2), (4) Date: Mar. 24, 2010

(87) PCT Pub. No.: WO2008/119538
PCT Pub. Date: Oct. 9, 2008

(65) Prior Publication Data
US 2010/0187878 A1    Jul. 29, 2010

(30) Foreign Application Priority Data

Apr. 3, 2007  (DE) .................... 10 2007 016 379
Sep. 14, 2007 (DE) .................... 10 2007 044 096

(51) Int. Cl.
*A47C 15/00* (2006.01)
(52) U.S. Cl.
USPC .................................... 297/232; 297/354.12
(58) Field of Classification Search
USPC ................... 297/232, 354.12, 354.1, 113
See application file for complete search history.

(56) References Cited

U.S. PATENT DOCUMENTS

| | | | | |
|---|---|---|---|---|
| 3,910,632 A | * | 10/1975 | Marechal | 297/232 |
| 4,067,611 A | * | 1/1978 | Kurozu et al. | 297/378.13 |
| 4,068,890 A | * | 1/1978 | Kurozu et al. | 297/378.13 |
| 4,883,319 A | * | 11/1989 | Scott | 297/354.1 |
| 5,273,336 A | * | 12/1993 | Schubring et al. | 296/65.17 |
| 5,380,060 A | * | 1/1995 | Sponsler et al. | 297/238 |
| 5,775,780 A | * | 7/1998 | Murphy et al. | 297/473 |
| 5,820,218 A | * | 10/1998 | Baloche et al. | 297/367 R |
| 5,868,460 A | * | 2/1999 | Christensen | 297/62 |
| 5,957,522 A | * | 9/1999 | Matsuhashi et al. | 296/66 |
| 6,047,444 A | * | 4/2000 | Braun | 16/324 |
| 6,341,820 B1 | * | 1/2002 | Kimura et al. | 297/378.13 |
| 6,733,078 B1 | * | 5/2004 | Zelmanov | 297/378.1 |
| 2004/0036334 A1 | * | 2/2004 | Kroner et al. | 297/354.12 |
| 2006/0208546 A1 | * | 9/2006 | Moffa et al. | 297/232 |

(Continued)

FOREIGN PATENT DOCUMENTS

| | | | | |
|---|---|---|---|---|
| DE | 3431820 C1 | * | 1/1986 | A47C 20/18 |
| DE | 3916444 C1 | * | 1/1991 | B60N 2/22 |

(Continued)

OTHER PUBLICATIONS

International Search Report mailed Jun. 8, 2008.

*Primary Examiner* — David E Allred
(74) *Attorney, Agent, or Firm* — Fletcher Yoder P.C.

(57) ABSTRACT

A vehicle seat includes a seat part and a partitioned back rest. The back rest has a first segment and a second segment. The segments are each equipped with an inclination adjuster. The adjusters include means for limiting the inclination of one segment relative to the other.

7 Claims, 4 Drawing Sheets

(56) References Cited

U.S. PATENT DOCUMENTS

| | | | |
|---|---|---|---|
| 2011/0121629 A1* | 5/2011 | Roth et al. | 297/354.12 |
| 2011/0156462 A1* | 6/2011 | Lim et al. | 297/354.12 |
| 2012/0292970 A1* | 11/2012 | Yamada et al. | 297/354.1 |

FOREIGN PATENT DOCUMENTS

| | | | | |
|---|---|---|---|---|
| DE | 44 05 347 | * | 8/1995 | |
| DE | 19735253 C1 | | 8/1998 | |
| DE | 19819776 | | 11/1998 | |
| DE | 10111126 C1 | * | 4/2002 | B60N 2/36 |
| DE | 10345650 A1 | * | 5/2005 | B60N 2/36 |
| DE | 10 2007 077 129 | * | 3/2009 | |
| EP | 0 992 393 | * | 4/2000 | |
| EP | 1186469 A1 | | 3/2002 | |
| FR | 2893561 A1 | * | 5/2007 | B60N 2/30 |
| GB | 2136685 B | * | 1/1987 | |
| JP | 05253036 A | * | 10/1993 | A47C 7/54 |

* cited by examiner

VEHICLE SEAT COMPRISING A PARTITIONED BACK REST

CROSS REFERENCE TO RELATED APPLICATIONS

This application claims priority from and the benefit of PCT Application No. PCT/EP2008/002548, filed on Mar. 31, 2008; German Patent No. DE 10 2007 016 379.9, filed on Apr. 3, 2007; and German Patent DE 10 2007 044 096.2, filed on Sep. 14, 2007; all entitled "Vehicle Seat Comprising a Partitioned Back Rest", which are herein incorporated by reference.

BACKGROUND

The invention relates to a vehicle seat comprising a seat part and a partitioned back rest which comprises a first segment and a second segment, said segments being each equipped with an inclination adjuster.

The generic vehicle seats are known from the prior art, for example from DE 198 19 776. The vehicle seats disclosed therein, however, often have safety deficiencies and/or may be used in a manner which is not intended.

It was, therefore, the object of the present invention to improve the safety of such vehicle seats, in particular rear seat benches and to avoid incorrect use.

SUMMARY

The object is achieved by a vehicle seat comprising a seat part and a partitioned back rest which comprises a first segment and a second segment, said segments being each equipped with an inclination adjuster and having a means that limits the inclination of the one segment relative to the other segment.

According to the invention, the vehicle seat comprises a seat part and a back rest. Whilst the seat part may be in one piece or partitioned, the back rest is partitioned into a first segment and into a second segment. Both segments are each equipped with an inclination adjuster, by means of which the respective segment may be adjusted in its angle relative to the seat part. This adjustment may be used for improving the comfort of the vehicle occupants and/or for adjusting the respective segment from a position of use into a stowage position. In the position of use, in which the back rest is substantially upright, a passenger may be seated on the seat part in the region of the respective segment. In the stowage position, the respective segment is arranged substantially parallel to the seat part and this region of the vehicle seat may thus be used as a stowage space and/or to provide the possibility for loading. The inclination adjustment may be oriented both in the direction of the seat part, i.e. generally in the direction of travel and away from the seat part i.e. generally counter to the direction of travel.

According to the invention, the vehicle seat further comprises a means that limits the inclination of at least one segment relative to the other segment, i.e. the one segment may be inclined differently from the other segment only to a limited degree.

The vehicle seat according to the invention is considerably safer than vehicle seats according to the prior art, as it is not possible, for example, for a segment of the vehicle seat to be in the position of use and thus able to be moved by a vehicle occupant, whilst the other seat segment, on which for example safety-relevant components are arranged, is in the stowage position and said components are therefore not available. The means ensure, in particular, that an adjustment of each back rest segment is possible independently of one another for improving the comfort, and that, however, one segment may only be moved together with the other segment from the position of use into the stowage position and vice versa.

Preferably, the means accordingly prevent the first segment from being located in a position of use and the second segment from being located in a stowage position.

All inclination adjusters known to the person skilled in the art are considered as inclination adjusters, by which the inclination of a back rest may be adjusted relative to a seat part. Preferably, all inclination adjusters of the vehicle seat according to the invention operate according to the latching pawl principle. Preferably, each back rest segment has an inclination adjuster which is particularly preferably located on one side of the respective segment. At a distance therefrom, each back rest segment additionally has a further mounting means, for example a hinge, by which it is additionally mounted on the seat part or on the vehicle bodywork. It is, however, also conceivable for the respective back rest segment, with two inclination adjusters which are arranged to the right and left on the back rest segment, to be mounted on the seat part or the vehicle bodywork.

Preferably, the inclination adjusters have one respective fitting on the back rest side, on which one respective positive connecting means is arranged, which are formed in a manner complementary to one another. The positive connecting means of the one fitting cooperates with the positive connecting means of the other fitting, so that they restrict the movement of the one fitting relative to the other fitting. At least one positive connecting means of the one fitting is, however, designed such that the complementary positive connecting means of the other fitting has a certain play, before said positive connecting means positively cooperate with one another. In particular, the one positive connecting means is a projection which engages in a recess, the recess preferably being designed to be larger than the projection so that said positive connecting means are able to be moved to a certain extent relative to one another before they cooperate and then may only be moved together in one direction.

Preferably, the positive connecting means are arranged on annular projections.

In a preferred embodiment, a seat belt is fastened to the second segment, by means of which a vehicle occupant who is seated in the region of the first segment may be belted-up. In said preferred embodiment, the means prevent the first back rest segment of the first seat region—viewed from the occupant—from being able to be adjusted behind the second back rest segment, which includes the seat belt roller, as satisfactory operation of the seat belt is then impaired.

Preferably, the vehicle seat is a seat bench which provides space for a plurality of vehicle occupants. Particularly preferably, the seat bench is a rear seat bench which is arranged behind the driver and passenger seat.

Preferably, the seat bench comprises a back rest with a larger and a smaller part. For example, the partition is 60%/40% or ⅔ to ⅓. Particularly preferably, the first and second segments are parts of the larger part. Particularly preferably, the back rest is partitioned into three, in particular into two larger and one smaller part, quite particularly preferably the smaller part being located between the larger parts. For example, the partition is a 20-40-20 partition.

A further or a preferred subject of the present invention is a vehicle seat which has a means which only permits a locking of the inclination adjuster when said inclination adjuster is located in a specific position relative to another inclination adjuster.

By means of this inventive or preferred embodiment it is ensured that one segment, for example of a back rest, may be locked in a position in which it represents a safety risk.

Preferably, the inclination adjusters adopt the same position for the locking i.e. they are preferably located either in the stowage position or in the position of use.

Preferably, the inclination adjusters are the inclination adjusters of a central segment and an edge segment of a back rest.

According to the invention, the vehicle seat has a means which only permits locking of the inclination adjuster when said vehicle seat is in a specific position relative to the inclination adjuster. Preferably, the means is a ramp which prevents the locking as long as the position of the corresponding inclination adjuster does not correspond to the desired position.

Preferably, the ramp cooperates with a control means. Preferably, the control means moves along the ramp until the desired position is reached. In this position, or shortly before this position, the control means then performs a control movement which permits the locking of the respective inclination adjuster.

Preferably, the control means also cooperates with the ramp in a locking manner.

DRAWINGS

The invention is explained hereinafter with reference to FIGS. 1-6. These explanations are provided merely by way of example and do not restrict the general inventive idea.

DETAILED DESCRIPTION

Figure 1:
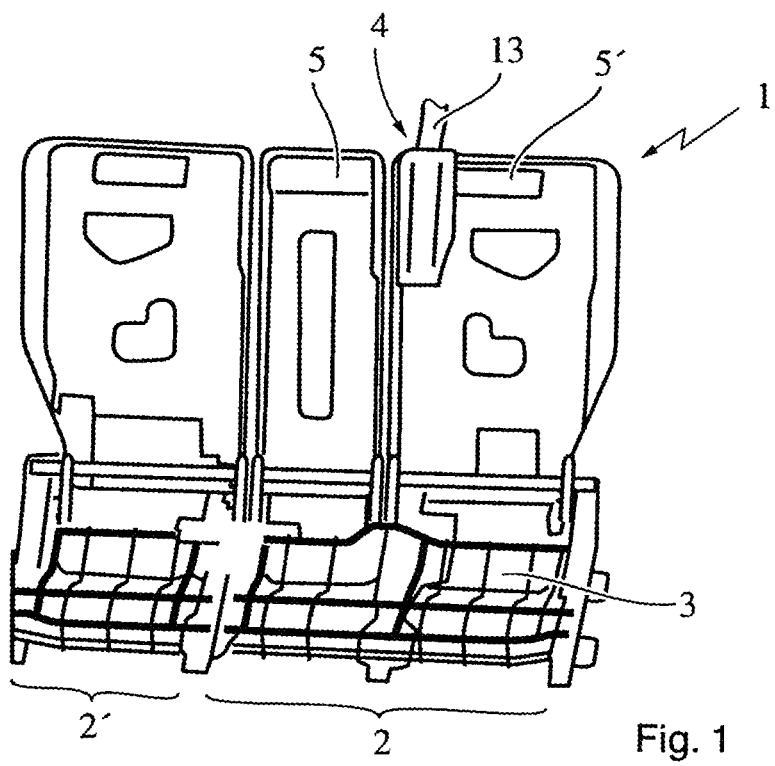
FIG. 1 shows the vehicle seat according to the invention as a rear seat bench.

The rear seat bench 1 shown in FIG. 1 is, overall, split into a left-hand 60% part 2 and a right-hand 40% part 2', which may be adjusted entirely independently of one another in their inclination and longitudinal position in the vehicle. The part 2' is not considered hereinafter. The rear seat bench may be used by vehicle occupants so that the back rests are located in the so-called position of use.

Figure 2:
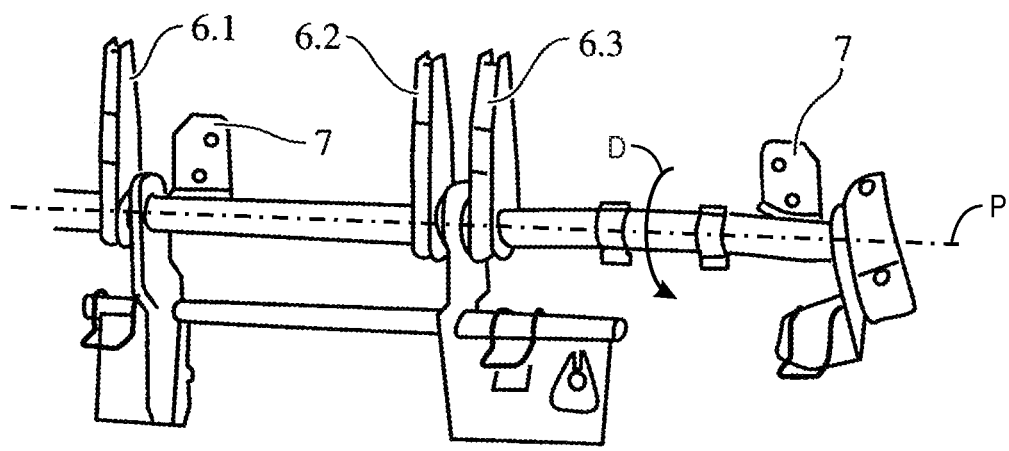
FIG. 2 shows the mounting of the segments of the back rest.

The 60% part 2 has a continuous 60% seat part 3 and a back rest 4, which in turn is partitioned into a first 20% back rest segment 5 arranged centrally in the rear seat bench 1 and a left-hand second 40% back rest segment 5'. In this connection, on the right-hand upper edge of the back rest segment 5' a seat belt roller 13 is fastened for an occupant who is seated in the region of the central first back rest segment 5. The back rest segments 5, 5' may be adjusted in their inclination relative to the seat part 3 and also relative to one another about a pivot axis P (e.g., in a direction D). As a result, the comfort of the occupants may be increased. The possibility is, however, also provided to fold the central first back rest segment 5 onto the seat part 3 to provide the possibility of loading the vehicle, so that said back rest segment is located in the so-called stowage position. However, in addition, the second back rest segment 5 may optionally be folded onto the seat part. To this end, as may be seen in FIG. 2, inclination adjusters 6.2 are provided on the right-hand side of the back rest segment 5, and spaced apart therefrom in the region of the left-hand side of the first back rest segment 5 a hinge 7 is provided for the central back rest segment 5, and an inclination adjuster 6.3 is provided on the left-hand side of the second back rest segment 5' and spaced apart therefrom a right-hand lateral hinge 7 is provided for the back rest segment 5'. The inclination adjuster 6.1, which is also shown, belongs to the 40% part 2' (FIG. 2) which is not relevant to the invention. All inclination adjusters 6.1 to 6.3 preferably operate according to the latching pawl principle.

Figure 3:
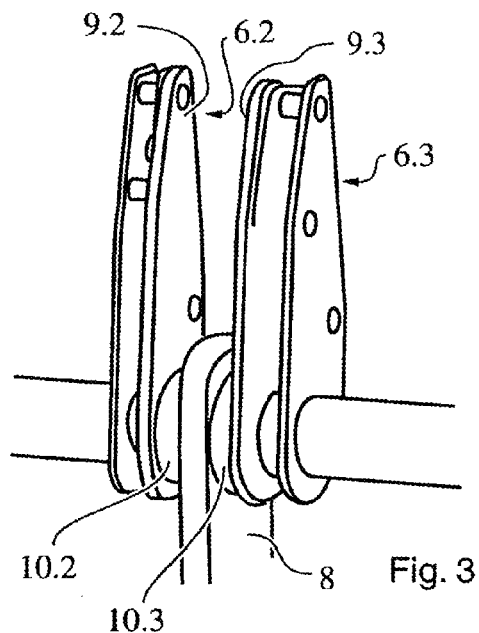
FIG. 3 shows a detail of the mounting according to FIG. 2.
Figure 4A:
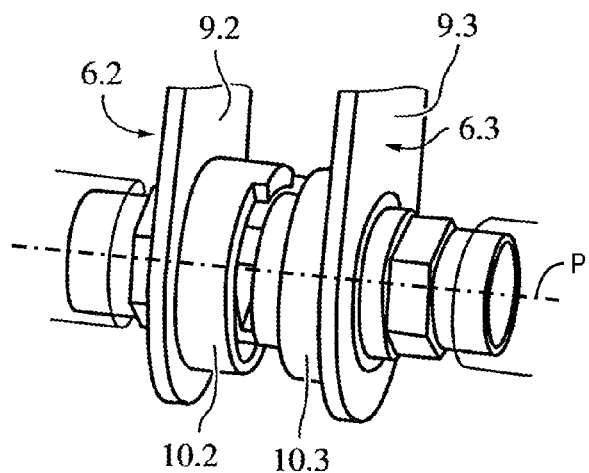
FIGS. 4A and 4B show the means for restricting the inclination of the first segment.
Figure 4B:
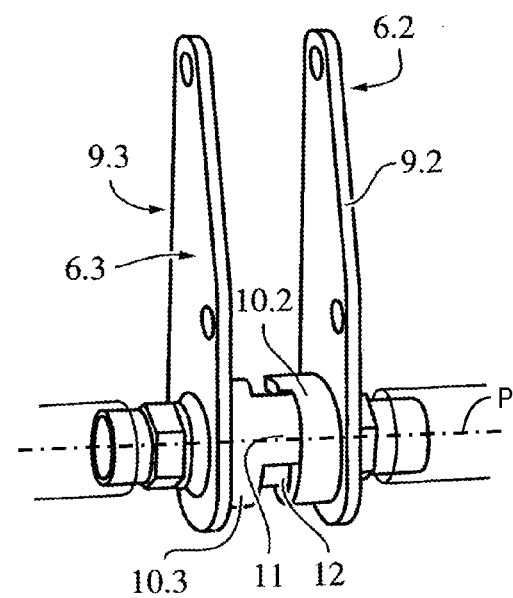

As is visible from FIG. 3, the inclination adjusters 6.2 and 6.3 are arranged on both sides of a linking plate 8 for fastening to the vehicle floor and have on their fitting plates 9.2, 9.3 on the back rest side annular projections 10.2, 10.3 which face one another, which are provided with at least one claw-like axial projection 11, which is arranged in this case on an annular projection 10.3. Said annular projection engages in at least one complementary axial recess 12, which in this case is arranged on the opposing annular projection 10.2, so that the annular projections 10.2, 10.3 and thus also the back rest segments 5, 5' are restricted in their pivotability relative to one another about the pivot axis P. FIG. 4a is a view from the front; FIG. 4b is a view from the rear. In particular, it is thereby prevented that the lateral back rest segment 5' may be folded onto the seat part 3 when the back rest segment 5 is upright, whereby a safety belt would no longer be available to a seat occupant in the region of the central back rest segment 5. In particular in FIGS. 4a and 4b, it is also visible that the projection 11 has a certain play in the recess 12, so that the fittings 9.2, 9.3 may also be adjusted independently of one another to a certain extent. This is important, in particular, for adjusting the comfort of the two back rest segments 5, 5'. The person skilled in the art recognizes that a plurality of projections 11 and a plurality of recesses 12 may be arranged on the fitting plates.

Figure 5:
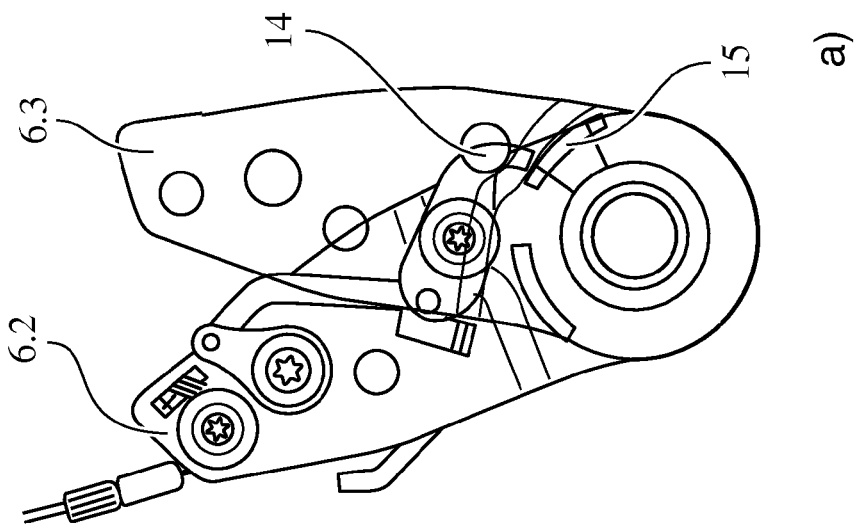
FIG. 5 shows a further embodiment of the vehicle seat according to the invention.
Figure 5:
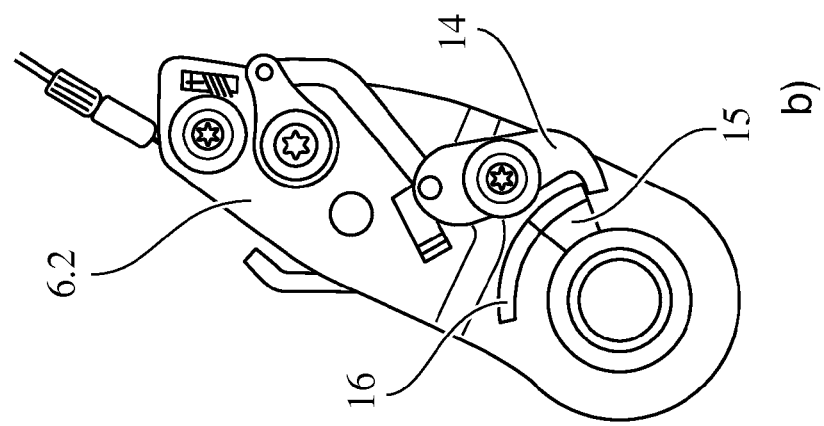
Figure 5:
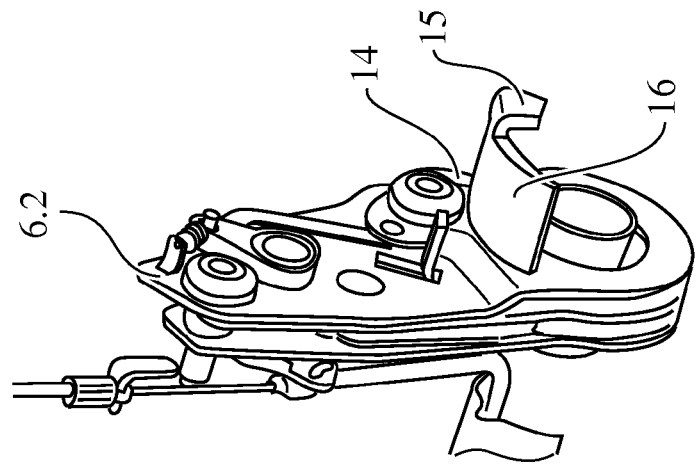

FIG. 5 shows a further embodiment of the vehicle seat according to the invention. Two inclination adjusters 6.2, 6.3 may be seen, by which the inclination of a different back rest segment may respectively be adjusted. In the present case, the inclination adjuster 6.2 is arranged on a 20% segment arranged in the center, whilst the inclination adjuster 6.3 belongs to a back rest segment located adjacent to the side. In the left-hand view 5a the inclination adjuster 6.2 is located in front of the inclination adjuster 6.3; i.e. is pivoted, for example, in the direction of the seat surface. In this position, the inclination adjuster 6.2 may not be locked. The locking is prevented by a control means 14, which is arranged rotatably on the inclination adjuster 6.2 and is rotatably pretensioned clockwise. One end of this control means 14 cooperates with a ramp 15 arranged directly or indirectly on the inclination adjuster 6.3, which prevents the control means 14 from rotating clockwise. At its other end remote from the ramp 15, the control means 14 is connected to a actuating means which prevents a latching means, not shown, from locking the inclination adjuster 6.2. In FIG. 5b the inclination adjuster 6.2 has been rotated clockwise so that its position has been synchronized with the inclination adjuster 6.3. In this position, the inclination adjuster 6.2 may now be locked. This is achieved by the control means 14 carrying out a control movement as soon as it has reached the end of the ramp 15, in the present case a rotational clockwise movement. The actuating means which is also arranged on the control means 14, which is moved therewith during the control movement, either causes the locking of the inclination adjuster 6.2 itself or releases a locking means. Moreover, it is visible in FIG. 5*b* that a stop 16 is arranged on the inclination adjuster 6.2 which bears against the ramp 15. Moreover, it is visible that the control means 14 is not only a control means but also a locking means, the tip thereof cooperating in a locking manner with the ramp 15. By means of the stop 16, a clockwise rotational movement of the inclination adjuster 6.2 is prevented and by means of the locking means 14 a counter-clockwise rotational movement of the inclination adjuster 6.2 relative to the inclination adjuster 6.3 is prevented. In the right-hand part of FIG. 5, the inclination adjuster 6.2 is again shown in a perspective view. Moreover, the stop 16, the control means 14 as well as the ramp 15 arranged on the inclination adjuster 6.3 are visible.

Figure 6:
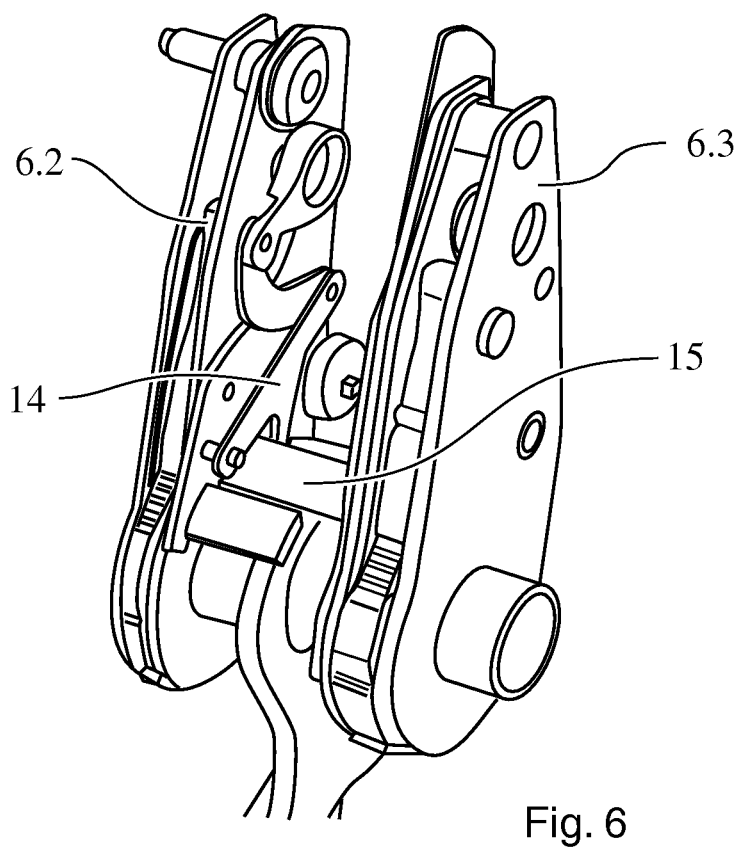
FIG. 6 shows the two inclination adjusters with a ramp located therebetween.

FIG. 6 shows the two inclination adjusters in a perspective view. It is visible that a ramp 15 is arranged between the two inclination adjusters 6.2 and 6.3. Moreover, the control means 14 may be seen in FIG. 6, which in this view also permits a torque transmission from the inclination adjuster 6.2 to the inclination adjuster 6.3.

The invention claimed is:

1. A vehicle seat comprising a seat part and a partitioned back rest which comprises a first segment and a second segment, the first segment being equipped with a first inclination adjuster, and the second segment being equipped with a second inclination adjuster;

wherein the first inclination adjuster is configured to facilitate rotation of the first segment about a pivot axis between a first use position and a first stowage position and to facilitate adjustment of a first angle of the first segment relative to the seat part while the first segment is in the first use position, the second inclination adjuster is configured to facilitate rotation of the second segment about the pivot axis between a second use position and a second stowage position and to facilitate adjustment of a second angle of the second segment relative to the seat part while the second segment is in the second use position, each inclination adjuster comprises a respective positive connecting means, the positive connecting means are configured to facilitate adjustment of the first angle of the first segment, independently of the second angle of the second segment, while the first segment is in the first use position, the positive connecting means are configured to cooperate via rotational engagement to block rotation of the first segment from the first use position to the first stowage position while the second segment is in the second use position, the positive connecting means are configured to facilitate adjustment of the second angle of the second segment, independently of the first angle of the first segment, while the second segment is in the second use position, the positive connecting means are configured to cooperate via rotational engagement to block rotation of the second segment from the second use position to the second stowage position while the first segment is in the first use position, and the positive connecting means are arranged on annular projections extending about the pivot axis.

2. The vehicle seat as claimed in claim 1, wherein the positive connecting means comprise a projection which engages in a recess.

3. The vehicle seat as claimed in claim 1, wherein a seat belt is fastened to one segment to facilitate securing a vehicle occupant to the other segment.

4. The vehicle seat as claimed in claim 1, wherein the vehicle seat comprises a seat bench.

5. The vehicle seat as claimed in claim 4, wherein the seat bench comprises a back rest with a partition into a larger part and a smaller part.

6. The vehicle seat as claimed in claim 5, wherein the segments are parts of the larger part.

7. The vehicle seat as claimed in claim 1, wherein the positive connecting means are configured to cooperate via rotational engagement to block rotation of the first segment from the first stowage position to the first use position while the second segment is in the second stowage position, and the positive connecting means are configured to cooperate via rotational engagement to block rotation of the second segment from the second stowage position to the second use position while the first segment is in the first stowage position.

* * * * *